C. F. DAVIS.
BACK GEAR FOR LATHE HEADS AND THE LIKE.
APPLICATION FILED FEB. 12, 1914.
1,249,905. Patented Dec. 11, 1917.
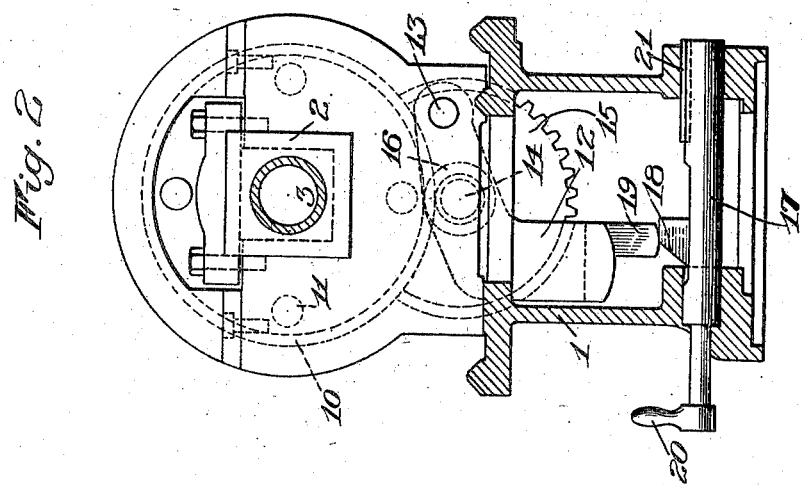
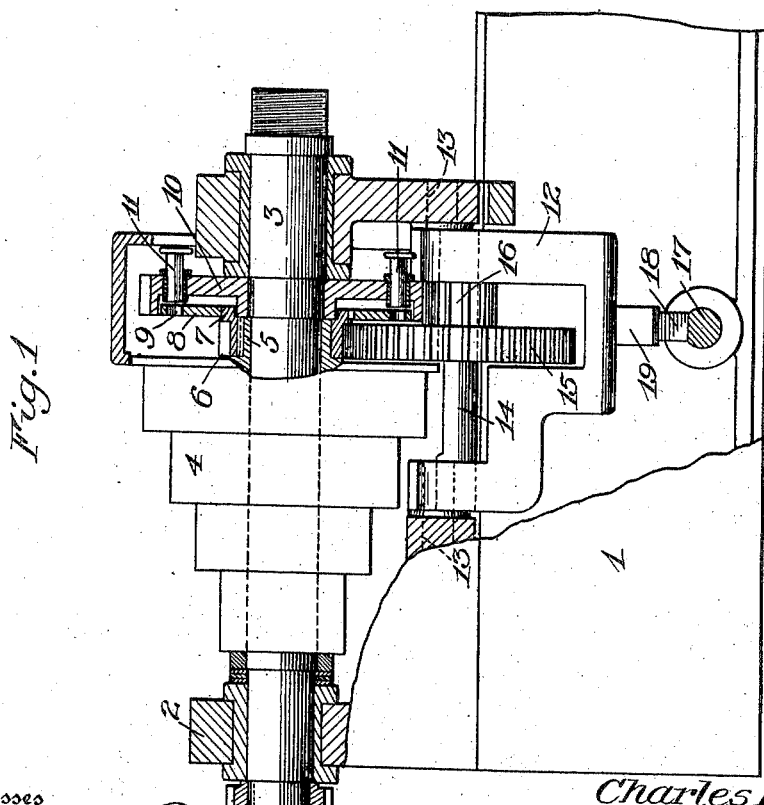
Witnesses
Walter B. Payne
Nelson H. Copp
Inventor
Charles F. Davis
By Church & Rich
his Attorneys

UNITED STATES PATENT OFFICE.

CHARLES F. DAVIS, OF ROCHESTER, NEW YORK, ASSIGNOR, BY MESNE ASSIGNMENTS, TO DAVIS MACHINE TOOL COMPANY, INC., OF ROCHESTER, NEW YORK, A CORPORATION OF NEW YORK.

BACK GEAR FOR LATHE-HEADS AND THE LIKE.

1,249,905.

Specification of Letters Patent.

Patented Dec. 11, 1917.

Application filed February 12, 1914. Serial No. 818,379.

*To all whom it may concern:*

Be it known that I, CHARLES F. DAVIS, of Rochester, in the county of Monroe and State of New York, have invented certain new and useful Improvements in Back Gear for Lathe-Heads and the like; and I do hereby declare the following to be a full, clear, and exact description of the same, reference being had to the accompanying drawings, forming a part of this specification, and to the reference-numerals marked thereon.

The present invention relates to a back gear mechanism for lathe heads and similar machinery where it is necessary to shift from fast to slow speed for certain kinds of work, and it has for its primary object to provide a construction whereby a more compact arrangement is obtained with consequent advantages in manufacture and use of the machine. A further purpose of the invention resides in so disposing the parts as to reduce to a minimum the torsional strains that are usually present in this type of mechanism and to eliminate the chattering and resulting loss of power which is present in the usual back gear drive. To these and other ends the invention consists in certain improvements and combinations of parts, all as will be hereinafter more fully described, the novel features being pointed out in the claims at the end of the specification.

In the drawings:

Figure 1 is a view in side elevation, partly in longitudinal vertical section, showing a portion of a lathe head equipped with a preferred arrangement of the invention, and Fig. 2 is a transverse vertical sectional view.

Similar reference numerals throughout the several figures indicate the same parts.

In the present embodiment, 1 designates the frame of the machine provided with suitable bearings 2 in which is journaled the spindle 3 receiving power from a driving member including a cone-pulley 4, at different speeds, as will presently appear more clearly. The driving member embracing the cone-pulley 4, is loosely mounted on the spindle 3 and is provided with a collar 5 upon which is keyed a pinion 6. The collar 5 is also provided with an extension 7 carrying a plate 8 fixed thereon and provided with one or more openings 9 for a purpose that will be explained.

Arranged adjacent to the collar 5 on the spindle, is a driven member consisting of a gear wheel 10 which carries one or more locking pins 11 that are slidable transversely thereof and adapted to engage the openings 9 in the plate 8 whereby to drive the gear 10 and the spindle at the same speed as the driving member. When it is desired to rotate the spindle at a lower speed, the pins 11 are withdrawn from locking engagement with the plate 8, as shown in Fig. 1, permitting the driving member to turn independently of the gear 10. Under such conditions, the spindle is driven through a back gear arrangement which reduces the speed, and to this end, there is provided an oscillatory or pivotally mounted frame 12, mounted in bearings 13 and carrying a fixedly mounted arbor 14. Arranged on said arbor 14 are transmission devices disposed in close proximity, and preferably in juxtaposition to each other, which are adapted to transmit power from the driving member to the driven member at a reduced speed, and preferably consisting of the gear 15 arranged to engage the pinion 6, and a pinion 16 arranged to engage the gear 10. The gear 15 and pinion 16 are rotatable together on the arbor 14 and are preferably formed integral, although there are other ways in which they may be constructed, so long as they are maintained in close relation to each other.

The frame 12 is movable to shift the transmission devices 15 and 16 into or out of engagement with the driving and driven members, and in the present construction there is shown a convenient arrangement for accomplishing this consisting of a reciprocatory operating spindle 17 which carries a cam projection 18 arranged to engage a leg 19 on the frame 12, so that as the spindle 17 is moved inwardly or outwardly of the frame 1, the frame 12 is elevated or lowered. 20 designates a handle for operating the spindle 17 which is slidable in bearings in the frame 1 and held against rotation by a key 21. It will be obvious that the raising and lowering of the frame 12 may be accomplished in a different manner than by the means just described, and any convenient mechanism for elevating or lowering the transmission devices into or out of engagement with the driving or driven members is considered within the scope and purpose of the invention.

It is to be noted that the transmission devices are arranged beneath the spindle and the driving and driven members, and this is deemed an important feature of the invention as it affords a much more compact arrangement and eliminates any shafting or gearing arranged laterally of the spindle and driving member. Furthermore, by disposing the transmission devices in close proximity to each other instead of spacing them at some considerable distance along a shaft, a much more rigid and powerful structure is produced, that is vastly better capable of withstanding the strains to which the parts are subjected in changing from one speed to another. The arrangement affords an extremely simple structure that can be operated quite readily under all conditions and presents little possibility of the parts failing in their proper and most effective coöperation.

I claim as my invention:

1. In a back gear for lathe heads, the combination with a lathe bed having a head stock, a rotary tool carrying spindle journaled therein, and a driving gear wheel fixed to the spindle, a driven pulley journaled on the spindle, a pinion fixed to the pulley adjacent the gear wheel, and means for detachably connecting said combined pulley and pinion with the gear wheel, of a yoke frame pivotally supported in the head stock on bearings located beneath and at one side of the axis of the spindle and having a depending operating portion projecting into the bed, a transmission gear wheel and pinion journaled on the yoke frame and adapted to coöperate with the gear wheel on the spindle and the pinion on the pulley and a device accessible at the forward side of the lathe bed beneath the head stock and coöperating with the operating portion of the yoke frame to operate it to adjust the transmission gear and pinion into and out of operative position.

2. In a lathe, the combination with a bed frame, a head stock at one end thereof, a tool carrying spindle journaled in the head stock, a driven gear wheel fixed to the spindle, a driving pinion loosely carried on the latter, and means for detachably interlocking the gear wheel and pinion together, of a yoke frame pivoted to the head stock below and in rear of the axis of the spindle and having a depending operating end extending into the bed frame, a transmission gear wheel and pinion journaled on the yoke and adapted to be moved thereby into and out of operative engagement with the pinion and gear wheel, respectively, on the spindle, and a reciprocating shaft guided in the bed and having a lug coöperating with the operating portion of the yoke to raise and lower the latter.

CHARLES F. DAVIS.

Witnesses:
ALBERT H. STEANS,
ANNE DAWSON.

Copies of this patent may be obtained for five cents each, by addressing the "Commissioner of Patents Washington, D. C."